US006188728B1

(12) United States Patent
Hurst

(10) Patent No.: US 6,188,728 B1
(45) Date of Patent: Feb. 13, 2001

(54) BLOCK MOTION VIDEO CODING AND DECODING

(75) Inventor: Robert Norman Hurst, Hopewell, NJ (US)

(73) Assignee: Sarnoff Corporation, Princeton, NJ (US)

( * ) Notice: Under 35 U.S.C. 154(b), the term of this patent shall be extended for 0 days.

(21) Appl. No.: 09/388,701

(22) Filed: Sep. 2, 1999

Related U.S. Application Data

(60) Provisional application No. 60/102,214, filed on Sep. 29, 1998.

(51) Int. Cl.$^7$ ............................. H04N 7/36; H04N 7/50
(52) U.S. Cl. ...................................................... 375/240.16
(58) Field of Search ................... 375/240.16; 348/402.1, 348/413.1, 416.1; H04N 7/36, 7/50

(56) References Cited

U.S. PATENT DOCUMENTS

| | | | |
|---|---|---|---|
| 4,245,248 | * 1/1981 | Netravali et al. | 348/400.1 |
| 5,708,732 | * 1/1998 | Merhav et al. | 375/240.11 |
| 5,838,827 | * 11/1998 | Kobayashi et al. | 375/240.16 |
| 6,025,880 | * 2/2000 | Nakagawa et al. | 375/240.16 |

FOREIGN PATENT DOCUMENTS

| | | | |
|---|---|---|---|
| 0 713 339 A2 | 5/1996 | (EP) | H04N/7/36 |
| 0 794 674 A2 | 9/1997 | (EP) | H04N/7/26 |

OTHER PUBLICATIONS

Koc U –V et al: "Adaptive Overlapping Approach for DCT–Based Motion Estimation" Proceedings of Theinternational Conference on Image Processing. (ICIP), US, Los Alamitos, IEEE Comp. Soc. Press, 1995, pp. 223–226, XP000624215 ISBN: 0–7803–3122–2 Abstract Paragraph'0001!

PCT International Search Report Corresponding to PCT Application PCT/US99/22635.

* cited by examiner

*Primary Examiner*—Howard Britton
(74) *Attorney, Agent, or Firm*—William J. Burke

(57) ABSTRACT

During transform-based video compression processing, motion vectors, which are identified during motion estimation and then used during motion-compensated inter-frame differencing, are constrained to coincide with block boundaries in the reference data. Block-based motion vectors have components that correspond to integer multiples of block dimensions. For example, for (8×8) blocks, allowable motion vector components are ( . . . , −16, −8, 0, +8, +16, . . . ). Constraining motion vectors in this way enables the resulting encoded video bitstream to be further processed in the transform domain without having to apply inverse and forward transforms. In particular, an existing input bitstream is partially decoded to recover the motion vectors and prediction error (i.e., dequantized transform coefficients). Because the motion vectors coincide with block boundaries in the corresponding reference data, motion-compensated inter-frame addition can then performed in the transform domain to generate transform data for subsequent processing (which may ultimately involve re-encoding the transform data into another encoded video bitstream). Because motion compensation can be performed in the transform domain, the bitstream data can be further processed in the transform domain and without having to apply expensive and lossy inverse and forward transforms.

22 Claims, 4 Drawing Sheets

BLOCK MOTION VIDEO CODING AND DECODING

CROSS-REFERENCE TO RELATED APPLICATIONS

This application claims the benefit of the filing date of U.S. provisional application No. 60/102,214, filed on Sep. 29, 1998.

This invention was made under U.S. Government Contract 70NANB5H1174 with NIST. The Government has certain rights in the invention.

BACKGROUND OF THE INVENTION

1. Field of the Invention

The present invention relates to video compression and decompression algorithms.

2. Description of the Related Art

In a typical transform-based video compression algorithm, such as one conforming to the Moving Picture Experts Group (MPEG) family of algorithms, a block-based transform, such as a discrete cosine transform (DCT), is applied to blocks of image data corresponding either to pixel values or pixel differences generated, for example, based on a motion-compensated inter-frame differencing scheme. The resulting transform coefficients for each block are then typically quantized for subsequent encoding (e.g., run-length encoding followed by variable-length encoding) to generate an encoded video bitstream.

Depending on the particular video compression algorithm, images may be designated as the following different types of frames for compression processing:

An intra (I) frame which is encoded using only intra-frame compression techniques, A predicted (P) frame which is encoded using inter-frame compression techniques based on a reference frame corresponding to a previous I or P frame, and which can itself be used to generate a reference frame for encoding one or more other frames, and A bidirectional (B) frame which is encoded using inter-frame compression techniques based on either (i) forward, (ii) reverse, or (iii) bidirectional prediction from either (i) a previous I or P frame, (ii) a subsequent I or P frame, or (iii) a combination of both, respectively, and which cannot itself be used to encode another frame.

Note that, in P and B frames, one or more blocks of image data may be encoded using intra-frame compression techniques.

In any case, in order to decode the resulting encoded video bitstream, the particular compression processing is reversed and inverted. For example, variable-length decoding may be applied to the bitstream, followed by run-length decoding and then dequantization to generate blocks of dequantized transform coefficients. An inverse transform is then applied to the blocks of dequantized transform coefficients to generate either (1) decoded pixel data or (2) pixel difference data (depending on whether the corresponding block of image data was originally encoded using (1) intra-frame or (2) inter-frame compression techniques, respectively). If motion-compensated inter-frame compression techniques were used, then inter-frame addition is applied to the pixel difference data using motion-compensated reference frame data to generate the decoded pixel data, where the amount of motion compensation is determined by motion vectors encoded into the bitstream during compression processing. The motion-compensated reference frame data may be considered to be a prediction of the decoded image data and the pixel difference data may be considered to be the error in that prediction. As such, the motion-compensated inter-frame addition step corresponds to the correction of the prediction.

In some applications, additional processing is to be applied after an encoded video bitstream has been generated. Typically, the encoded video bitstream was previously generated by another, perhaps remote, processor and is treated as an input for purposes of the desired additional processing. For example, it may be desirable to perform "transcoding," in which an existing encoded video bitstream that conforms to one video compression/decompression (codec) algorithm is converted into a corresponding encoded video bitstream that conforms to a different video codec algorithm. One "brute force" approach to performing such a transcoding operation is to fully decode the input bitstream to the decoded pixel domain based on the first video codec algorithm and then fully encode the resulting decoded pixel data into the output bitstream based on the second video codec algorithm.

Another possible application may be the insertion of a watermark into an existing encoded video bitstream. Here, too, one brute force approach to watermark insertion is to fully decode the input bitstream to the decoded pixel domain, perform processing on the decoded pixel data in the pixel domain to insert the desired watermark, and then fully re-encode the modified pixel data to generate the desired processed output encoded video bitstream.

In a typical transform-based video codec algorithm, the forward and inverse transform steps may be relatively expensive in terms of both coding complexity and processing time. In addition, for lossy transforms, the application of the inverse transform and then re-application of the forward transform during brute force processing of an existing encoded video bitstream will typically result in loss of information contained in the input bitstream, leading to degradation of decoded image quality in the processed bitstream. As such, it is desirable to be able to perform certain processing operations (e.g., related to transcoding or watermark insertion) on an input bitstream without first having to fully decode the bitstream. If such processing operations can be performed in the transform domain without significant loss of information, then expensive and lossy inverse and forward transform steps can be avoided.

SUMMARY OF THE INVENTION

The present invention is directed to video compression and decompression techniques that enable further processing to be applied to an existing encoded video bitstream without first having to fully decode the input bitstream. In particular, the present invention enables partially decoded video data to be processed in the transform domain without significant—or even possibly any—loss of information contained in the input bitstream. As such, the present invention avoids having to apply expensive and lossy inverse and forward transform steps during the processing of the existing input bitstream.

According to the present invention, any motion-compensated inter-frame video compression techniques used to generate the input encoded video bitstream are limited to being based on motion vectors that coincide with block boundaries. For example, in an MPEG video compression algorithm based on an (8×8) DCT transform, motion vector components are limited to integer multiples of 8 (where the integers may be positive, negative, or zero). As a result, processing operations can be applied to partially decoded video data in the transform domain without suffering significant (or possibly any) loss of information. For a typical MPEG video codec algorithm, the input encoded video bitstream may be variable-length decoded, run-length decoded, and dequantized to generate DCT coefficient data. Because the motion vectors are constrained to coincide with block boundaries, motion-compensated inter-frame addition may then be performed in the DCT transform domain without first having to apply an inverse DCT transform. The resulting motion-compensated transform data may then be subjected to the particular desired processing operations (e.g., transcoding operations, insertion of watermarks) in the transform domain. Depending on the application, the resulting processed DCT coefficient data may then subjected to at least some of motion estimation, motion-compensated inter-frame subtraction, re-quantization, run-length re-encoding, and variable-length re-encoding to generate the desired processed output encoded video bitstream, without having to implement separate inverse and forward DCT transform steps.

According to one embodiment, the present invention is a method for compressing video data, comprising the steps of (a) performing motion estimation on a frame of the video data based on corresponding reference data to identify a set of motion vectors for the frame, wherein the motion estimation is constrained to identify only block-based motion vectors that coincide with block boundaries in the reference data and at least one of the block-based motion vectors is a non-zero motion vector; (b) applying motion-compensated inter-frame differencing to the video data based on the reference data and the block-based motion vectors to generate inter-frame difference data; and (c) applying one or more additional video compression steps to the inter-frame difference data to generate encoded data for an encoded video bitstream corresponding to the video data.

According to another embodiment, the present invention is a method for processing an existing input encoded video bitstream, comprising the steps of (a) applying one or more decoding steps to the input bitstream to recover transform coefficient data in a transform domain and corresponding block-based motion vectors, wherein the block-based motion vectors are constrained to coincide with block boundaries in corresponding reference data; (b) performing motion-compensated inter-frame addition in the transform domain based on the block-based motion vectors and the reference data to generate prediction-error-corrected (PEC) transform coefficient data; and (c) performing subsequent processing on the PEC transform coefficient data in the transform domain.

According to yet another embodiment, the present invention is a method for compressing video data, comprising the steps of (a) performing motion estimation on a frame of the video data based on corresponding reference data to identify a set of motion vectors for the frame, wherein the motion estimation is constrained to identify only block-based motion vectors that coincide with block boundaries in the reference data and all of the block-based motion vectors are zero motion vectors; (b) applying motion-compensated inter-frame differencing to the video data based on the reference data and the block-based motion vectors to generate inter-frame difference data; and (c) applying one or more additional video compression steps to the inter-frame difference data to generate encoded data for an encoded video bitstream corresponding to the video data, wherein the encoded video bitstream conforms to an MPEG codec algorithm.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
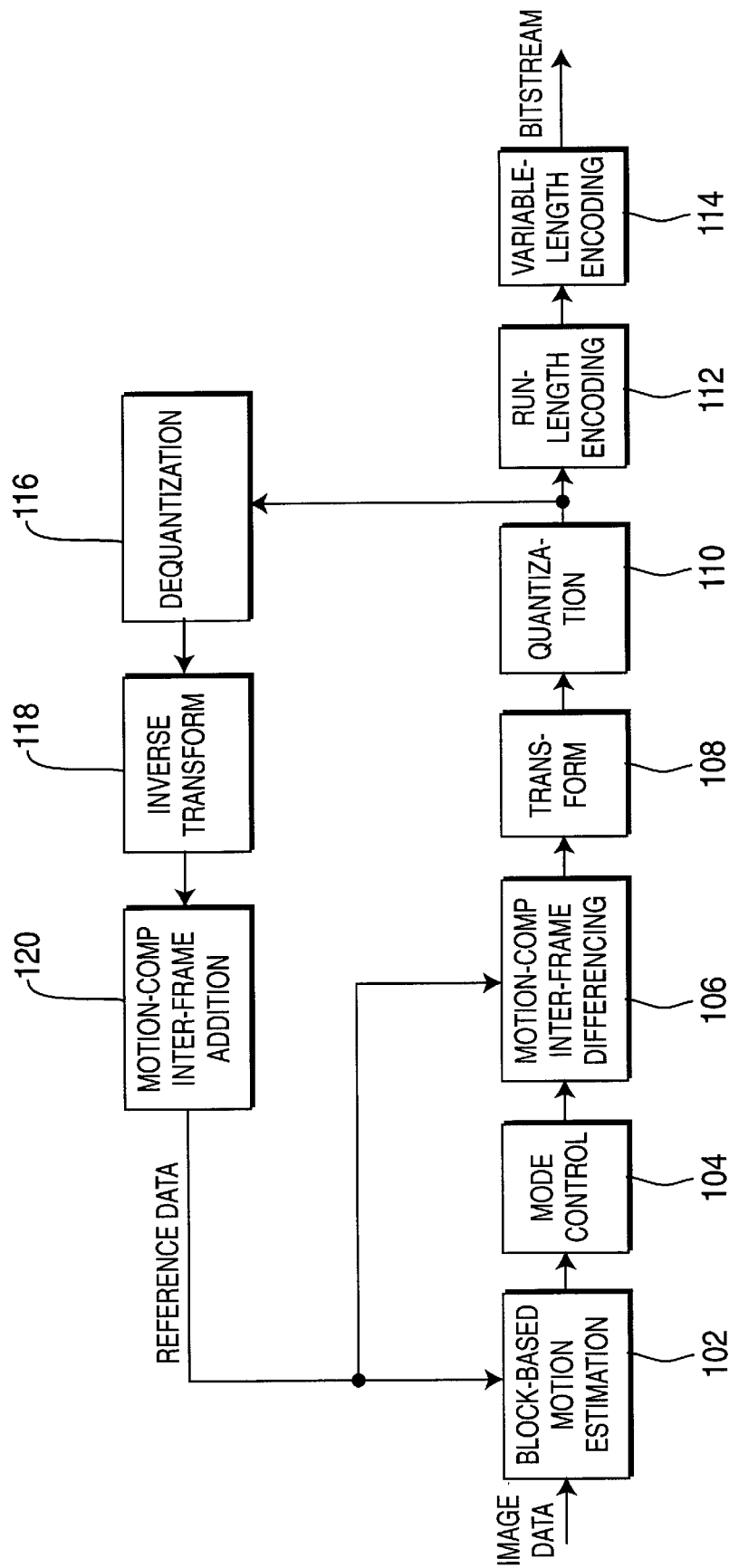
FIG. 1 shows a block diagram of motion-compensated inter-frame video compression processing, according to one embodiment of the present invention.

FIG. 1 shows a block diagram of motion-compensated inter-frame video compression processing, according to one embodiment of the present invention. According to this embodiment, motion vectors are constrained to coincide with block boundaries.

In particular, block-based motion estimation 102 is performed on input image data relative to appropriate reference data. Depending on whether the inter-frame video compression processing is based on (i) forward prediction, (ii) backward prediction, or (iii) bi-directional prediction, the reference data is generated based on either (i) a previous frame, (ii) a subsequent frame, or (iii) a combination of both (e.g., an average of previous and subsequent frames), respectively. In any case, the motion estimation processing attempts to identify a block of reference data that most closely matches the current block of image data based on some appropriate similarity measure (e.g., sum of the absolute pixel differences (SAD)). According to the present invention, the set of blocks of reference data used during motion estimation processing is limited to those corresponding to block boundaries. In conventional motion estimation processing such a limitation does not exist, and available blocks of reference data for motion estimation processing correspond to any pixel (or even sub-pixel) location within a specified search range.

Figure 2:
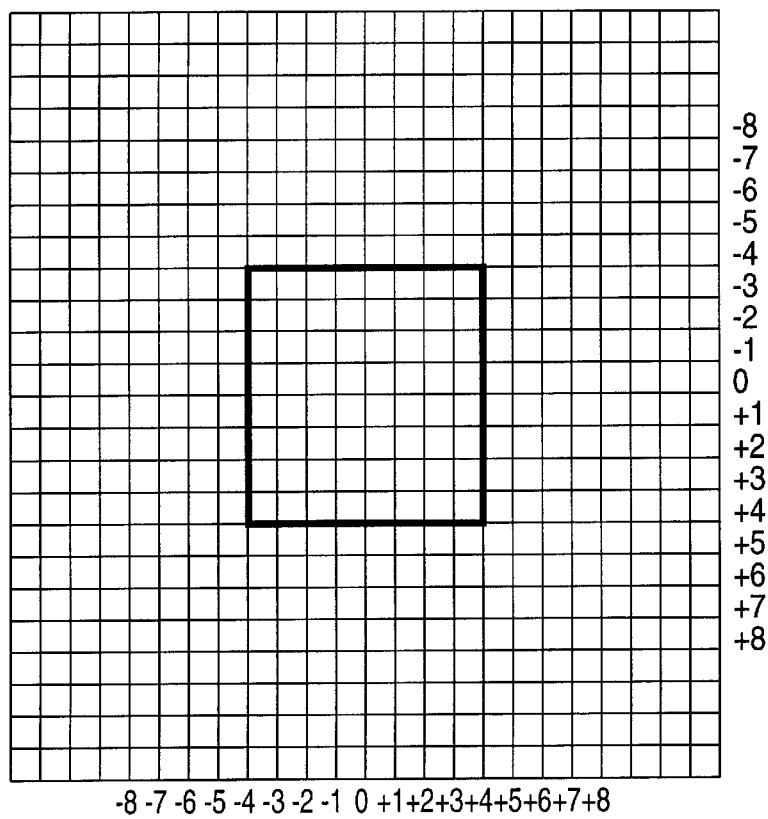
FIGS. 2 and 3 illustrate the differences between conventional motion estimation processing (FIG. 2) and the motion estimation processing of the present invention (FIG. 3) for (8×8) blocks of image data.
Figure 3:
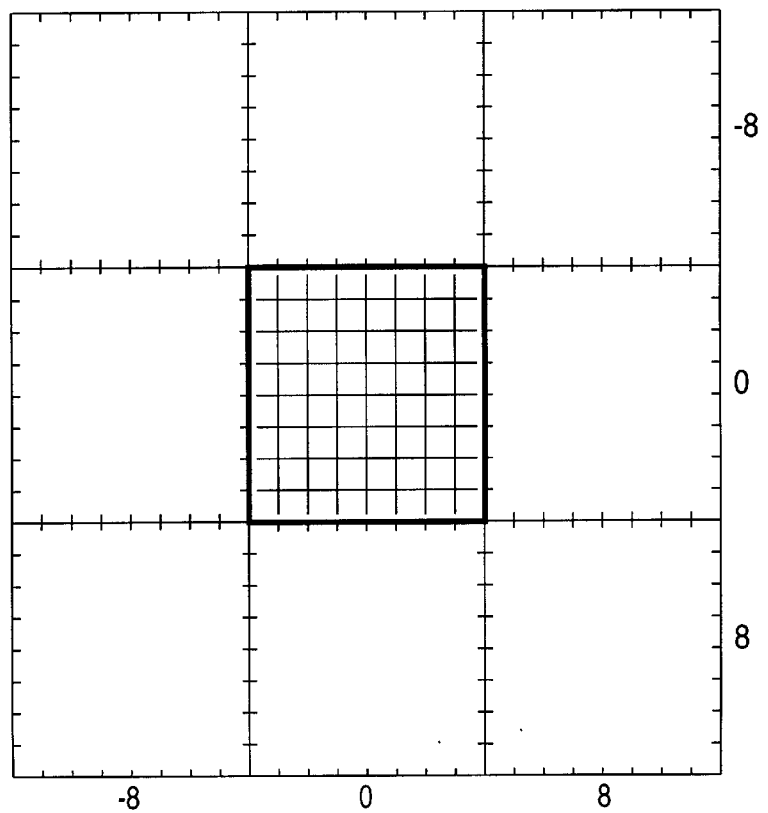

FIGS. 2 and 3 illustrate the differences between conventional motion estimation processing (FIG. 2) and the motion estimation processing of the present invention (FIG. 3) for (8×8) blocks of image data. FIGS. 2 and 3 show search regions of reference data for a particular (8×8) block of image data, whose corresponding location in the reference data is represented in the figures by a thick (8×8) block having a motion vector of (0,0) corresponding to the center of the block. The search regions in FIGS. 2 and 3 are based on motion vectors whose components are each limited to a magnitude of 8 pixels (i.e., motion vector components can vary independently from −8 to +8).

As indicated in FIG. 2, under conventional integer-pixel-based motion estimation processing, there are 289 different available (8×8) blocks of reference data corresponding to the 289 different integer-based motion vectors based on combinations of the 17 different integer component values from −8 to +8. In motion estimation schemes based on "fractional pixels," even more blocks of reference data are available.

On the other hand, as indicated in FIG. 3, for this particular example of the block-based motion estimation processing of the present invention, the available blocks of reference data are limited to the 9 blocks corresponding to block boundaries (i.e., having one of the 9 motion vectors based on combinations of 3 different component values: −8, 0, and +8.) The typical prediction resulting from this block-based motion estimation scheme will be less accurate than conventional pixel-based motion estimation schemes, but, for many applications, the accuracy of block-based prediction will be acceptable.

Since the number of available blocks of reference data is greatly reduced for a given search range (e.g., from 289 to 9 in the example of FIGS. 2 and 3), block-based motion estimation processing of the present invention can be performed much more quickly. Moreover, the search range can be greatly extended, while still reducing the processing time required for motion estimation relative to conventional pixel-based motion estimation schemes. For example, extending the search range to ±24 instead of ±8 still leaves only 49 (8×8) blocks of reference data to be processed. In fact, the search range can be extended to ±64, before the same number of reference blocks (i.e., 289) become available as for pixel-based motion estimation with a search range limited to ±8.

Depending on the particular video compression algorithm and depending on the type of frame (e.g., P or B), the motion estimation processing of block 102 may identify three different block-based motion vectors for each block of image data: one based on forward prediction, one based on backward prediction, and one based on bi-directional prediction. Mode control processing 104 is implemented after motion estimation to determine how to encode the current block of image data, including the possibility of encoding using intra-frame encoding techniques. Depending on the results of that encoding mode control, inter-frame differencing 106 may then be performed on the image data using the corresponding motion-compensated reference data to generate a block motion-compensated inter-frame pixel difference data.

In any case, a transform 108, such as an (8×8) DCT transform, is then applied to the block of pixel-domain data to generate a block of transform coefficients, which are then quantized 110, run-length encoded 112, and variable-length encoded 114 to generate a portion of the encoded video bitstream. Although not shown in FIG. 1, if appropriate, the motion vector used to encode the block of image data is also encoded into the bitstream.

Since run-length encoding 112 and variable-length encoding 114 are typically loss-less encoding steps, the decode processing that is part of the compression algorithm of FIG. 1 (i.e., the upper path in FIG. 1) can start with the quantized coefficient data generated by quantization block 110 without jeopardizing the reliability of the video codec algorithm. In particular, the quantized transform coefficients from block 110 are dequantized 116 and inverse transformed 118, and, if appropriate, motion-compensated inter-frame addition 120 is applied to generate reference data for potential use in encoding another set of image data.

Those skilled in the art will appreciate that, except for the block-based motion estimation of the present invention, the rest of the processing steps of FIG. 1 may be implemented based on conventional video compression techniques, such as those conforming to an MPEG standard.

Figure 4:
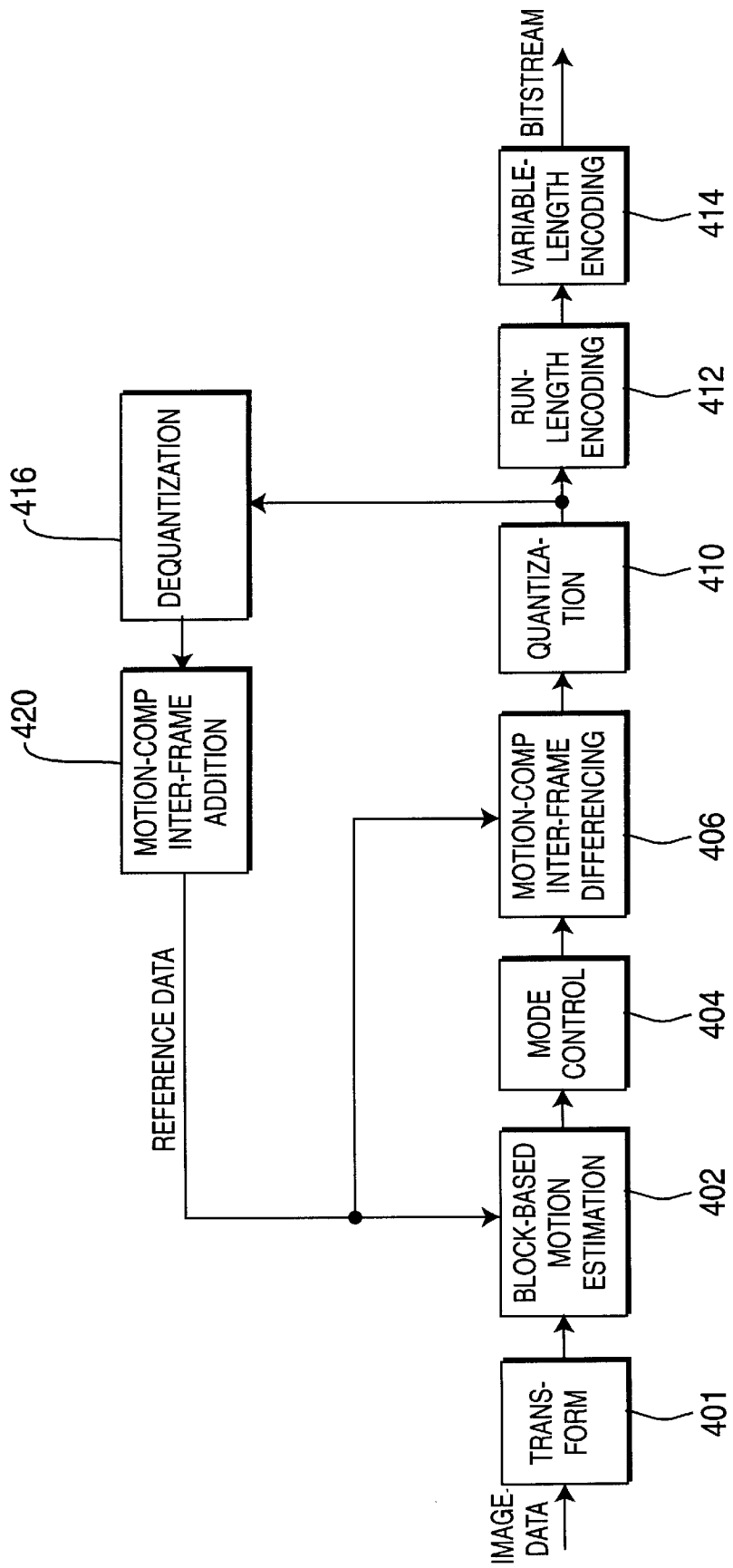
FIG. 4 shows a block diagram of motion-compensated inter-frame video compression processing, according to an alternative embodiment of the present invention.

FIG. 4 shows a block diagram of motion-compensated inter-frame video compression processing, according to an alternative embodiment of the present invention. Like the embodiment of FIG. 1, motion vectors are constrained to coincide with block boundaries. In FIG. 4, however, the transform 401 is applied to the raw image data prior to motion estimation 402. As such, block-constrained motion estimation 402, mode control 404, and motion-compensated inter-frame differencing 406 are all performed in the transform domain, rather than in the pixel domain as in the embodiment of FIG. 1. Since motion estimation and compensation are performed in the transform domain, the step of motion-compensated inter-frame addition 420 that occurs in the encoder feedback path may also be performed in the transform domain. As a result, the inverse transform does not have to be performed at all during encoding processing. The steps of quantization 410, run-length encoding 412, variable-length encoding 414, and dequantization 416 may be identical to the analogous steps in the embodiment of FIG. 1.

Figure 5:
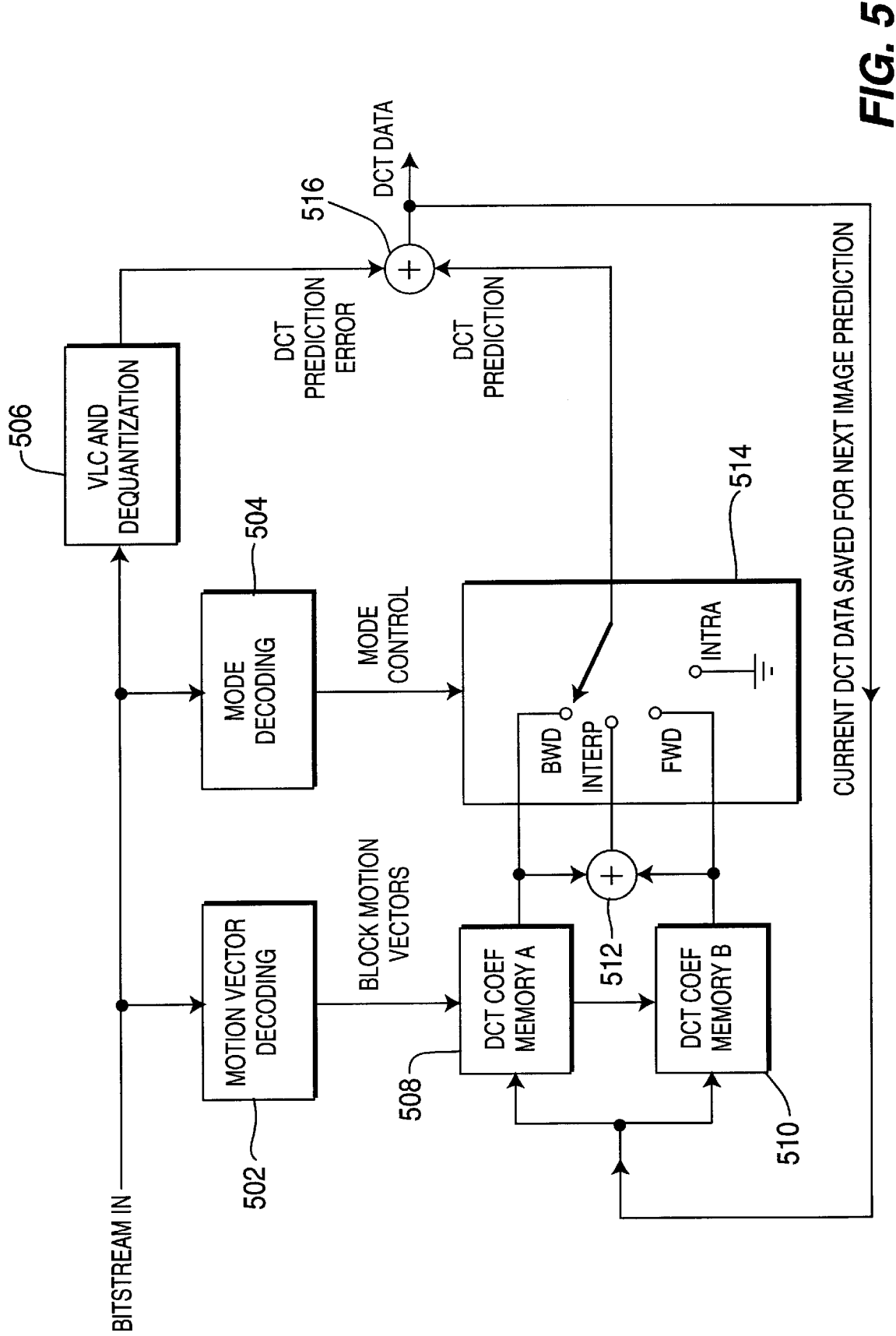
FIG. 5 shows a block diagram of partial decode processing, according to one embodiment of the present invention.

FIG. 5 shows a block diagram of partial decode processing, according to one embodiment of the present invention. The partial decode processing of FIG. 5 is designed to operate on existing encoded video bitstreams generated using the block-based motion-compensated inter-frame video compression algorithm of FIG. 1. In particular, the partial decode processing receives and partially decodes an input bitstream to generate output dequantized transform data. Additional processing steps (e.g., related to transcoding or watermark insertion and not shown in FIG. 5) may then be applied in the transform domain to the dequantized transform data to generate a processed transform data that may then be further encoded to generate a desired processed encoded video bitstream.

In particular, motion vector decoding 502, mode decoding 504, and variable-length decoding/run-length decoding/dequantization 506 are applied to the input bitstream to recover, respectively, (1) the block-based motion vectors, (2) the mode control information (i.e., whether blocks were encoded using intra-frame techniques or inter-frame techniques based on forward, backward, or bi-directional (i.e., interpolated) prediction), and (3) the dequantized transform (e.g., DCT) coefficients, which correspond to the prediction error in the transform domain.

If available, memory A 508 retains transform-domain reference data (e.g., dequantized DCT coefficients) corresponding to a subsequent frame, while memory B 510 retains transform-domain reference data corresponding to a previous frame. The corresponding blocks of reference data from memories A and B, as identified by the block-based motion vectors recovered by decoding block 502, are averaged by averaging node 512 to form interpolated reference data for bidirectional prediction.

The state of four-position switch 514 is dictated by the decoded mode control data from block 504. If the mode control data indicates "backward prediction," then switch 514 is positioned to feed the appropriate (i.e., motion-compensated) subsequent-frame reference data from memory A to summation node 516. If the mode control data indicates "forward prediction," then switch 514 is positioned to feed the appropriate previous-frame reference data from memory B to summation node 516. If the mode control data indicates "bi-directional prediction," then switch 514 is positioned to feed the appropriate interpolated reference data from averaging node 512 to summation node 516. Lastly, if the mode control data indicates "intra-encoding," then switch 514 is positioned to "ground" to feed zeros to summation node 516.

In any case, at summation node 516, the dequantized DCT coefficients from block 506 are added to the selected transform-domain reference data from switch 514, thereby correcting the prediction with the prediction error, all in the transform domain. If appropriate (i.e., if the current frame is an I or P frame), the transform data from summation node 516 is fed back to memory A or B for use as reference data for encoding one or more other video frames.

Because motion vectors are limited to coincide with block boundaries and because transforms such as the DCT are linear, the motion-compensated inter-frame addition at summation node 516 can be performed in the transform domain and without first having to apply an inverse transform. As such, except for quantization loss and the like, the resulting motion-compensated transform data generated at summation node 516 corresponds to transform data that would result from applying the transform directly to the original image data. Additional processing (not shown in FIG. 5) can then be performed on the resulting corrected transform data without having to apply an inverse transform. This additional processing will typically include steps needed to generate the desired processed output encoded video bitstream. In that case, the additional processing may include motion estimation and motion compensation in the transform domain, requantization, run-length re-encoding, and variable-length re-encoding steps. In appropriate situations, the motion estimation and/or motion compensation steps in the transform domain may be skipped. For example, if the motion vectors from the input bitstream are re-used, then motion estimation can be skipped. If the output bitstream is generated without motion compensation, then both motion estimation and motion compensation may be skipped.

In addition to MPEG video codec algorithms, the present invention may be implemented for other suitable video codec algorithms, including algorithms based on transforms other than (8×8) DCT transforms and/or algorithms that do not include both run-length and variable-length encoding steps and/or have additional other post-quantization encoding steps.

The present invention may be implemented as circuit-based processes, including possible implementation on a single integrated circuit. As would be apparent to one skilled in the art, various functions of circuit elements may also be implemented in the digital domain as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for compressing video data, comprising the steps of:

(a) performing motion estimation on a frame of the video data based on corresponding reference data to identify a set of motion vectors for the frame, wherein the motion estimation is constrained to identify only block-based motion vectors that coincide with block boundaries in the reference data and at least one of the block-based motion vectors is a non-zero motion vector;

(b) applying motion-compensated inter-frame differencing to the video data based on the reference data and the block-based motion vectors to generate inter-frame difference data; and (c) applying one or more additional video compression steps to the inter-frame difference data to generate encoded data for an encoded video bitstream corresponding to the video data.

2. The method of claim 1, wherein one or more of the block-based motion vectors are zero motion vectors.

3. The method of claim 1, wherein steps (a) and (b) are performed in a pixel domain and step (c) comprises the steps of:

(1) applying a transform to the inter-frame difference data to generate transform coefficient data in a transform domain; and (2) quantizing the transform coefficient data to generate quantized transform coefficient data.

4. The method of claim 3, wherein the encoded video bitstream conforms to an MPEG codec algorithm and the transform is a discrete cosine transform (DCT).

5. The method of claim 3, wherein step (c) further comprises the steps of:

(3) run-length encoding the quantized transform coefficient data to generate run-length encoded (RLE) data; and (4) variable-length encoding the RLE data to generate variable-length encoded (VLE) data for the encoded video bitstream.

6. The invention of claim 1, wherein step (a) further comprises the step of applying a transform to pixel data to generate transform coefficient data in a transform domain, wherein the motion estimation is applied to the transform coefficient data based on the reference data in the transform domain.

7. The method of claim 6, wherein the encoded video bitstream conforms to an MPEG codec algorithm and the transform is a DCT transform.

8. The method of claim 1, wherein the reference data is based on forward prediction, backward prediction, or bidirectional prediction.

9. A machine-readable medium, having encoded thereon program code, wherein, when the program code is executed by a machine, the machine implements the steps of:

(a) performing motion estimation on a frame of video data based on corresponding reference data to identify a set of motion vectors for the frame, wherein the motion estimation is constrained to identify only block-based motion vectors that coincide with block boundaries in the reference data and at least one of the block-based motion vectors is a non-zero motion vector;

(b) applying motion-compensated inter-frame differencing to the video data based on the reference data and the block-based motion vectors to generate inter-frame difference data; and (c) applying one or more additional video compression steps to the inter-frame difference data to generate encoded data for an encoded video bitstream corresponding to the video data.

10. A method for processing an existing input encoded video bitstream, comprising the steps of:

(a) applying one or more decoding steps to the input bitstream to recover transform coefficient data in a transform domain and corresponding block-based motion vectors, wherein the block-based motion vectors are constrained to coincide with block boundaries in corresponding reference data;

(b) performing motion-compensated inter-frame addition in the transform domain based on the block-based motion vectors and the reference data to generate prediction-error-corrected (PEC) transform coefficient data; and (c) performing subsequent processing on the PEC transform coefficient data in the transform domain.

11. The method of claim 10, wherein at least one of the block-based motion vectors is a non-zero motion vector.

12. The method of claim 11, wherein one or more of the block-based motion vectors are zero motion vectors.

13. The method of claim 10, wherein all of the block-based motion vectors are zero motion vectors.

14. The method of claim 10, wherein the encoded video bitstream conforms to an MPEG codec algorithm and the transform domain corresponds to a DCT transform domain.

15. The method of claim 10, wherein step (c) comprises the step of applying one or more video compression steps to generate a processed output encoded video bitstream.

16. The method of claim 15, wherein the one or more video compression steps comprise the step of applying motion-compensated inter-frame differencing to processed transform coefficients in the transform domain to generate transform coefficient difference data.

17. The method of claim 16, wherein the one or more video compression steps further comprise the step of performing motion estimation on the processed transform coefficients in the transform domain.

18. The method of claim 16, wherein the one or more video compression steps further comprises the step of applying quantization, run-length encoding, and variable-length encoding to the transform coefficient difference data.

19. The method of claim 10, wherein step (a) comprises the steps of applying variable-length decoding, run-length decoding, and dequantization to generate the block of transform coefficient data.

20. The method of claim 10, wherein the reference data is based on forward prediction, backward prediction, or bidirectional prediction.

21. A machine-readable medium, having encoded thereon program code, wherein, when the program code is executed by a machine, the machine implements the steps of:

(a) applying one or more decoding steps to an existing input encoded video bitstream to recover transform coefficient data in a transform domain and corresponding block-based motion vectors, wherein the block-based motion vectors are constrained to coincide with block boundaries in corresponding reference data;

(b) performing motion-compensated inter-frame addition in the transform domain based on the block-based motion vectors and the reference data to generate prediction-error-corrected (PEC) transform coefficient data; and (c) performing subsequent processing on the PEC transform coefficient data in the transform domain.

22. A method for compressing video data, comprising the steps of:

(a) performing motion estimation on a frame of the video data based on corresponding reference data to identify a set of motion vectors for the frame, wherein the motion estimation is constrained to identify only block-based motion vectors that coincide with block boundaries in the reference data and all of the block-based motion vectors are zero motion vectors;

(b) applying motion-compensated inter-frame differencing to the video data based on the reference data and the block-based motion vectors to generate inter-frame difference data; and (c) applying one or more additional video compression steps to the inter-frame difference data to generate encoded data for an encoded video bitstream corresponding to the video data, wherein the encoded video bitstream conforms to an MPEG codec algorithm.

* * * * *